June 29, 1954   J. BREWER   2,682,636
WIDE RANGE ALTERNATING CURRENT-DIRECT CURRENT VOLTMETER
Filed Aug. 5, 1949   2 Sheets-Sheet 1
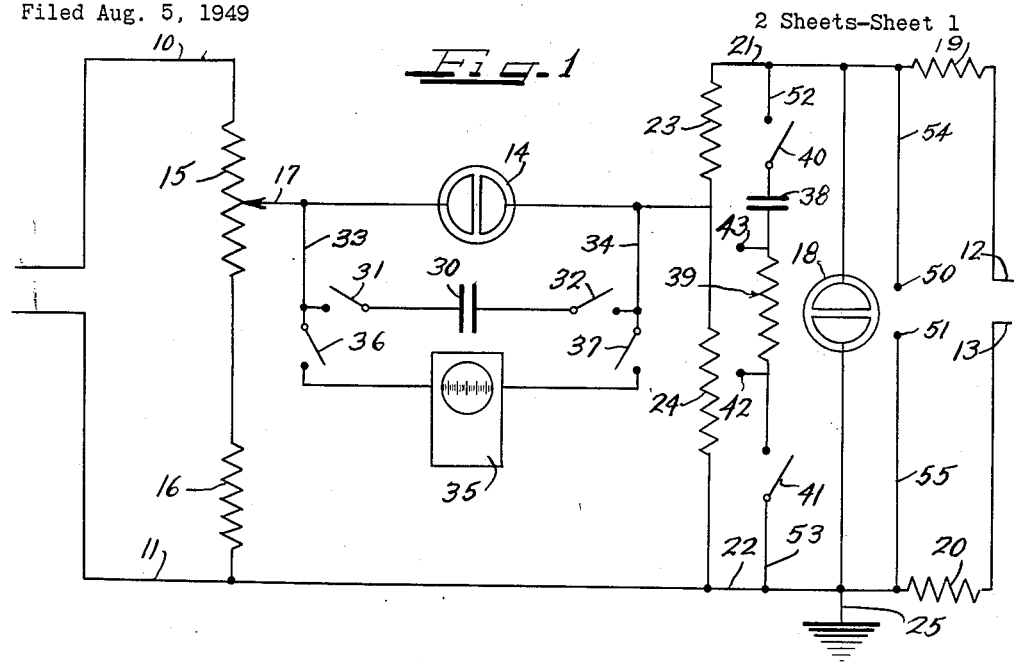
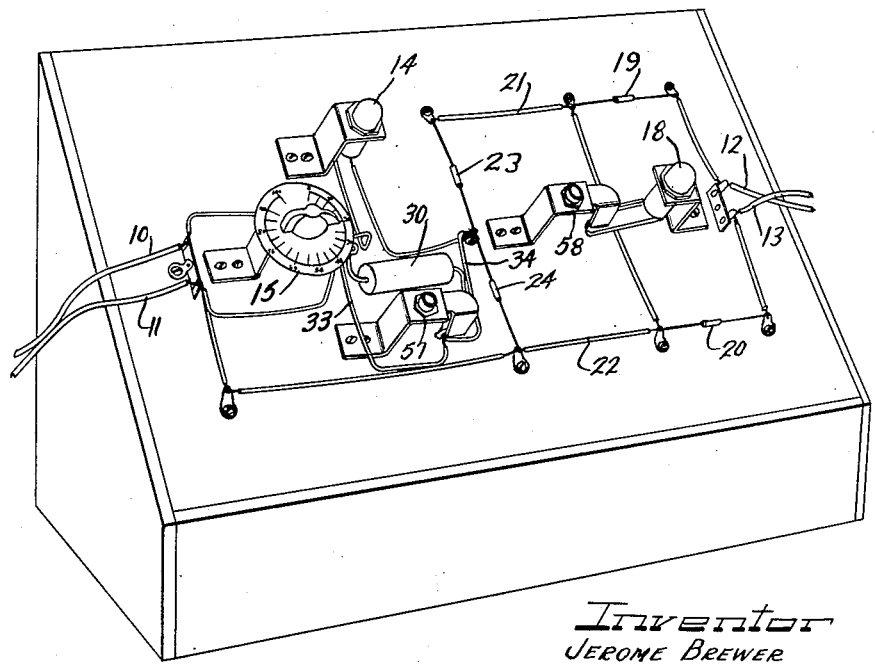
Inventor
JEROME BREWER
by The Firm of Charles A. Will
Attys.

June 29, 1954     J. BREWER     2,682,636
WIDE RANGE ALTERNATING CURRENT-DIRECT CURRENT VOLTMETER
Filed Aug. 5, 1949     2 Sheets-Sheet 2
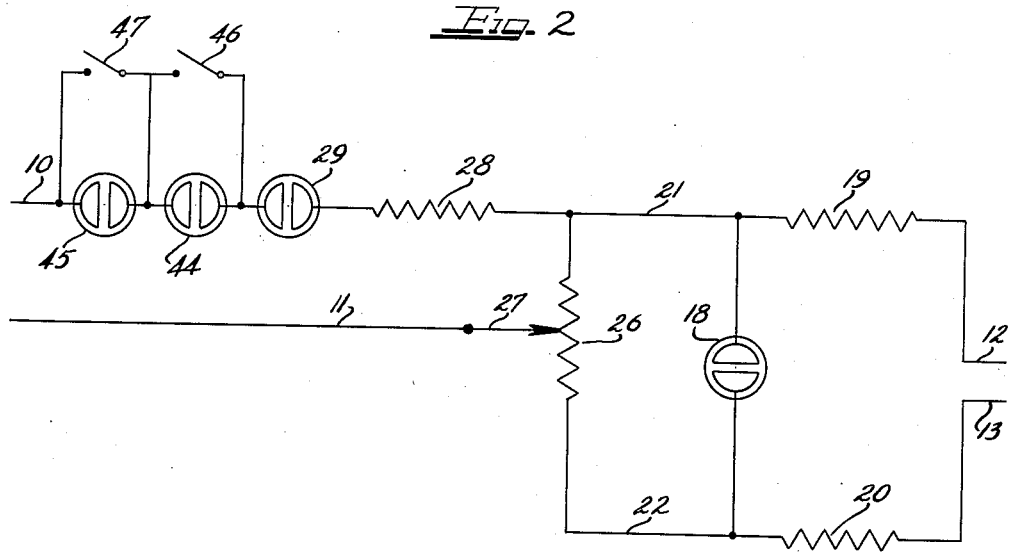
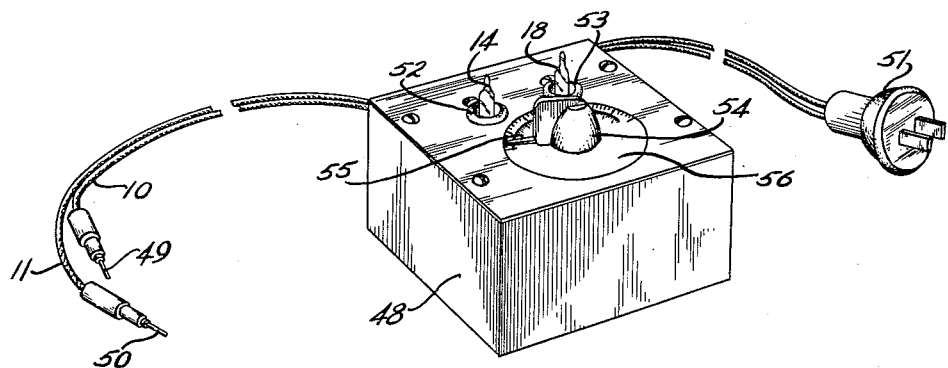
Inventor
JEROME BREWER Patented June 29, 1954

2,682,636

UNITED STATES PATENT OFFICE 2,682,636

WIDE RANGE ALTERNATING CURRENT-DIRECT CURRENT VOLTMETER

Jerome Brewer, Kansas City, Mo., assignor to Midwest Research Institute, Kansas City, Mo., a corporation of Missouri Application August 5, 1949, Serial No. 108,829

1 Claim. (Cl. 324—98)

This invention relates to an improved electrical instrument having a wide variety of uses, but one of the principal uses of which is as a wide range A. C.–D. C. voltmeter. More particularly, it relates to an instrument employing one or more glow lamps and which uses either the ignition or extinguishing voltage characteristic of that lamp or lamps as an essential indicating element of the circuit.

It is, of course, well known that glow lamps such, for example, as neon glow lamps have a characteristic ignition voltage as well as a characteristic extinguishing voltage. In the past, advantage has been taken of the characteristic of a glow lamp to indicate whether or not the source of unknown voltage is an alternating source of energy or a uni-directional source of energy. More recently, a neon voltmeter has appeared commercially which utilizes a calibrated potentiometer and is capable of measuring voltages of an unknown source provided the voltages of the unknown source are above the ignition voltage of the glow lamp. In other words, by tapping off a portion of the unknown voltage by means of a potentiometer, it has been possible to reduce the voltage drop across the glow lamp until it extinguishes. If such a potentiometer is calibrated against a known standard, it is possible to provide a reading for the instrument which will indicate the value of the unknown voltage. A great disadvantage of such an arrangement lies in the fact that it is not capable of measuring voltages below the ignition voltage of the glow lamp, which voltage in the case of a neon glow lamp lies in the vicinity of 80 volts D. C. or 65 volts A. C. This, of course, very materially limits the usefulness of an instrument such as that referred to above which has been available in the past.

One of the principal features and objects of the present invention is predicated on the concept of connecting in series a second calibrated voltage source to the unknown voltage source so that the source of potential across the indicating glow lamp is derived from two sources, one being the source whose voltage value is desired to be measured. By such an arrangement, it is possible to measure voltages far below the ignition voltage of the glow lamp, and thus the usefulness of the electrical instrument is enormously increased.

A further object of the present invention is to provide a novel high impedance A. C.–D. C. voltmeter.

Another object of the present invention is to provide a novel A. C.–D. C. voltmeter employing a glow lamp which will measure either A. C. or D. C. voltages both below and above the ignition voltage of the glow lamp.

It has been found that an electrical instrument possessing the above described and referred to characteristics has a wide range of usefulness and with a few additional elements, a multitude of functions. It is, therefore, one of the features and objects of the present invention to provide an electrical instrument employing one or more glow lamps which will function as a relaxation oscillator of variable frequency, which will measure resistance and capacitance, which will indicate the presence or absence of a moderately strong radiation (visible and ultra-violet light), which will act as a pulse generator, which will act as a detector of radioactivity and X-rays, and which may be used as a classroom demonstration instrument to illustrate a wide variety of uses and purposes of glow lamps.

The novel features which I believe to be characteristic of my invention are set forth with particularity in the appended claim. My invention itself, however, both as to its organization, manner of construction, and method of operation, together with further objects and advantages thereof, may best be understood by reference to the following description taken in connection with the accompanying drawings, in which:

Figure 1 is a diagrammatic illustration of an electrical instrument embodying the novel teachings and principles of the present invention;

Figure 2 is a diagrammatic illustration of a high impedance neon voltmeter embodying the novel teachings and principles of the present invention;

Figure 3 is an isometric view of an electrical instrument embodying my invention; and Figure 4 is an isometric view of a demonstrator circuit to illustrate applications of glow-discharge tubes.

In Figure 1 of the drawings, the circuit of an electrical instrument is illustrated which is arranged to be connected to two sources of potential through the conductors 10 and 11 on the one hand, and conductors 12 and 13 on the other hand. The conductors 10 and 11 are more specifically arranged to be connected to the source of voltage whose value and characteristics are to be determined. The conductors 12 and 13 are arranged to be connected to a 110-volt or 220-volt source of alternating or direct current or a dry battery greater than 90 volts. The indicating glow lamp of the electrical instrument is shown as a neon glow lamp 14. As previously pointed out, one of the principal features of the present invention is predicated on the concept of connecting in series the unknown voltage source or some portion thereof with the known voltage source. In the form of the invention shown in Figure 1, the portion of the unknown voltage which is to be added to the known voltage is obtained from a potentiometer 15 and a series connected resistor 16.

More specifically, the potentiometer 15 and the resistor 16 are connected in series across conductors 10 and 11, while the movable contact 17 of the potentiometer 15 is connected to one side of the neon glow lamp 14. The known voltage is obtained from a voltage regulator arrangement which includes connecting a second neon glow lamp to conductors 12 and 13 through resistor elements 19 and 20, respectively.

As is well known to those skilled in the art, this will supply a clipped sine wave of substantially constant peak-to-peak voltage at conductors 21 and 22, regardless of voltage variations in the A. C. or D. C. source. A pair of resistors 23 and 24 are connected in series between conductors 21 and 22. The resistor 23 should preferably be approximately $\frac{1}{10}$ of the resistor 24 when the glow lamp is a neon glow lamp. By way of example, and not by way of limitation, the resistor 23 may be 100,000 ohms, and resistor 24 may be 1 megohm. Likewise, by way of illustration, and not by way of limitation, the resistors 19 and 20 may be approximately 150,000 ohms apiece, resistor 16 may be approximately 50,000 ohms, and the potentiometer 15 may be 500,000 ohms.

The right side of the neon glow lamp 14 is connected to the mid-point between resistors 23 and 24.

The circuit is preferably grounded on one side as at 25. From the above description, it will at once be apparent that the biasing resistor 24 is in series with the lower portion of the potentiometer 15 and the resistor 16. It will further be apparent that when the lower conductor 11 of the input is of the same polarity as the upper conductor 12 of the known source, the voltage drop across the biasing resistor 24 is added to the voltage drop across the low part of the potentiometer 15 and the resistor 16 to impress the total voltage on the glow lamp 14.

The voltage derived from the biasing resistor 24 is, of course, below the ignition voltage of glow tube 14, because of the voltage drop across resistor 23. Since this voltage drop across the biasing resistor 24 is constant and is maintained constant by the voltage-regulating action of the glow lamp 18, it will at once be apparent that by calibrating the potentiometer 15, the position of the movable contact 17 will determine the amount of the voltage input across conductors 10 and 11. It will further be observed that the instrument with the conductors 12 and 13 connected to the A. C. or D. C. source provides an A. C.-D.C. voltmeter which will give reasonably accurate readings from approximately 10 volts to 80 volts.

Attention is also directed to the fact that by simply disconnecting conductors 12 and 13 from the A. C. or D. C. source, the instrument without any changes whatsoever immediately becomes available to read voltages from 80 volts up (the practical upper limit under the example of values hereinbefore given being in the neighborhood of 1,000 volts). It will, of course, be understood that there will be a second set of calibrations for the positions of the movable contact arm 17 to cover this second range.

From the above description, it will be observed that I have provided an extremely simple, inexpensive, practical A. C.-D. C. voltmeter capable of measuring a very wide range of voltages.

The instrument shown in Figure 1 also is provided with means capable of having it act as a relaxation oscillator of variable frequency. To this end, a capacitor 30 is connected across the glow lamp 14 through switches 31 and 32 and conductors 33 and 34, respectively. By way of example, and not by way of limitation, the capacitor 30 may be about 0.1 microfarad. With the switches 31 and 32 closed, and the conductors 10 and 11 connected to a D. C. voltage of about 100 volts and the conductors 12 and 13 not connected, the instrument will act as a relaxation oscillator and will provide the characteristic saw-tooth wave of a relaxation oscillator. By varying the setting of the movable contact arm 17 of the potentiometer 15, the frequency may be varied. Should it further be desired to analyze or inspect the characteristic shape of the output of the relaxation oscillator, an oscilloscope 35 is connected across capacitor 30 through switches 36 and 37.

With the circuit illustrated in Figure 1 and described above, and with the switches 31 and 32 closed and the conductors 10 and 11 connected to a source of D. C. voltage of about 100 volts, the instrument may be used to measure resistance and capacitance, for the frequency of oscillation is inversely proportional to the time constant RC. Thus, the frequency using known resistors and capacitors is compared with that obtained with an unknown resistor or capacitor substituted in the circuit.

As previously pointed out, the instrument may also be used as an indicator of the presence or absence of a light source. This may be accomplished by connecting conductors 12 and 13 to 110–115 volt A. C. source, and by connecting conductors 10 and 11 to a D. C. source of about 30 volts. The potentiometer control 17 is then rotated until the indicator glow lamp 14 is just ready to ignite. If this indicator glow lamp 14 is subjected to a moderately strong light source, the impingement of the light rays on the glow lamp will cause the glow lamp to ignite. The ignition of glow lamp 14 will be indicated by a deflection of a vacuum tube voltmeter (not shown) when connected across resistor 24.

Not only will the instrument act as an indicator of the presence or absence of a moderately strong light source (including ultra-violet light), but it will also act as a detector of the presence or absence of moderately strong gamma radiation, or even X-rays will produce a small change in the frequency of oscillation.

The instrument illustrated in Figure 1 may be used for demonstrating the voltage-regulating properties of a glow lamp by connecting the conductors 12 and 13 to a variable A. C. voltage source and by connecting an oscilloscope (not shown) to conductors 50 and 51. If the voltage applied to the conductors 12 and 13 is varied, the voltage-regulating properties of the glow lamp may be observed on the oscilloscope, and hence the use of a glow lamp as a peak clipping device for producing alternating voltage pulses can be observed.

The instrument shown in Figure 1 may be used as a pulse generator by connecting a pulse peaking circuit comprising a capacitor 38 and a resistor 39 across the glow lamp 18 through switches 40 and 41 and conductors 21 and 22, respectively. The capacitor 38, by way of example, and not by way of limitation, may be approximately 0.00025 microfarad and the resistor 39 may be 0.1 megohm. Under such circumstances, and when the unit is connected to a 110–115 volt A. C. source through conductors 12 and 13, the output of the glow lamp 18 is differentiated electrically and provides at the terminals 42 and 43 of the resistor 39 60-cycle pulses possessing steep wave fronts of short duration. These pulses may be observed by connecting terminals 43 and 42 to an oscilloscope (not shown).

From the above description, it will, of course, be appreciated that when the instrument is to be used solely as a wide range A. C.-D. C. voltmeter, all of the elements connected across the glow lamps 14 and 18 through conductors 33, 34, 52, 53, 54 and 55 may be eliminated.

In Figure 2 of the drawings, I have illustrated a second form of the present invention, and more particularly, I have illustrated a high impedance neon A. C.-D. C. voltmeter which is calibrated when the neon glow lamp ignites as distinct from the first embodiment of the invention which was calibrated when the neon glow lamp extinguishes. In this form of the invention, the output of the voltage regulator is connected through conductors 21 and 22 to the opposite ends of a potentiometer 26. The movable contact 27 of the potentiometer 26 is connected through conductor 11 to one side of the unknown voltage source. The top end of the potentiometer 26 is connected through a resistor 28 and a plurality of neon glow lamps 29, 44 and 45 to conductor 10 leading to the other side of the unknown voltage source. By way of example, and not by way of limitation, the potentiometer 26 may have a resistance of 500,000 ohms, while the resistor 28 may have a value of 100,000 ohms.

In this form of the invention, it will be apparent from the above description that when the lower conductor 11 of the unknown voltage input is of the same polarity at a given time as the upper conductor 21 of the known voltage source, the circuit is adding the proportional amount of voltage from the known voltage source represented by the upper portion of the potentiometer 26.

The number of neon glow lamps connected in series in the circuit of Figure 2 will depend upon the voltage range desired. Thus, when a voltage range of approximately 10–80 volts D. C. or 10–65 volts A. C. is to be determined, only one glow lamp, namely glow lamp 29 will be used. To this end, glow lamp 44 is shorted out of the circuit by closing a switch 46, while glow lamp 45 is shorted out of the circuit by closing the switch 47. When a higher range is required, switch 46 is opened, but switch 47 is closed. When a still higher range is desired, both switches 46 and 47 will be opened. Additional glow lamps and shorting switches may be inserted in series in the circuit without departing from the teachings of the present invention.

In considering the embodiment of the invention illustrated in Figure 2 of the drawings, it will be noted that there is substantially no load on the circuit to be measured, and for that reason, the glow lamp 29 must ignite to give a reading. It is to be noted, however, that when the glow lamp 29 ignites, you already have had your reading, and for that reason, it no longer makes any difference if you are drawing current. Since the glow lamp 29, before it ignites, has a very high impedance, it will be apparent that the instrument illustrated in Figure 2 is a high impedance voltmeter.

It will furthermore be observed that the potentiometer 26 may be calibrated to read voltage directly when the neon glow lamp ignites.

From the above description of the embodiments of the invention illustrated in Figures 1 and 2 of the drawings, it will be apparent that the instrument in each case may be used for either measuring A. C. voltages or D. C. voltages. When A. C. voltages are being measured, the neon glow lamp 14 of Figure 1 and the neon glow lamps 29, 44 and 45 of Figure 2 will have both plates glowing, while only one of the plates will glow when D. C. is being measured. The polarity may, of course, be determined by noting which of the two plates of the respective indicating glow lamps are glowing.

The simplicity of my invention, especially when it is being used as a wide range A. C.-D. C. voltmeter, is exemplified by the isometric view of the unit as shown in Figure 3 of the drawings. More specifically, the entire circuit may be conveniently housed within a small box 48 from which the conductors 10 and 11 extend and terminate in two contacting prongs 49 and 50. The conductors 12 and 13 also extend from the rear of the box 48 and terminate in a conventional plug 51 which may be connected to 110 to 220 A. C. or D. C. or connected to a battery greater than 90 volts. The indicator glow lamp 14 and the regulator glow lamp 18 each partially extend through openings 52 and 53, respectively, in the top of the box 48. The movable contact arm 17 of the potentiometer 15 is actuated by a knob 54 which carries a pointer 55 overlying a calibrated disk 56.

Figure 4 of the drawings illustrates one manner in which the invention may be assembled in a breadboard form and used as a demonstrator. The numerals employed in Figure 1 have been re-employed in Figure 4 to identify similar elements of the circuit. A jack 57 has been employed, however, in the place of the switches 36 and 37 which enables the oscilloscope 35 of Figure 1 to be quickly and conveniently connected into the circuit. A jack 58 has been employed to enable the resistor 39 and the condenser 38 to be connected across the regulator glow lamp 18 or to enable other elements to be connected as desired across the regulator glow lamp 18.

From the above description, it will be apparent that I have provided an extremely simple, low cost electrical instrument and apparatus.

I claim as my invention:

In a method of measuring an unknown voltage with a known voltage source, a glow lamp having a predetermined ignition voltage and an adjustable voltage divider, the steps of connecting said adjustable voltage divider to one of said known and unknown voltages to obtain a reference voltage which is a fraction of said one of said voltages, connecting said reference voltage in series with the other of said unknown and known voltages and said glow lamp, and adjusting said voltage divider until the differential between said reference voltage and said other of said voltages is equal to said ignition voltage as indicated by said glow lamp, the magnitude of said unknown voltage being then indicated by the position of said voltage divider.

(References on following page)

References Cited in the file of this patent

UNITED STATES PATENTS

| Number | Name | Date |
|---|---|---|
| 1,759,604 | Bjornson | May 20, 1930 |
| 1,974,433 | Riszdorfer | Sept. 25, 1934 |
| 2,037,925 | Rentschler | Apr. 21, 1936 |
| 2,149,558 | Stansbury et al. | Mar. 7, 1939 |
| 2,263,006 | McLeod | Nov. 18, 1941 |
| 2,310,328 | Swift | Feb. 9, 1943 |
| 2,321,605 | Keinath | June 15, 1943 |
| 2,365,568 | Langer | Dec. 19, 1944 |
| 2,450,153 | Moore | Sept. 28, 1948 |
| 2,509,815 | Elliott | May 30, 1950 |
| 2,525,705 | Moore | Oct. 10, 1950 |

FOREIGN PATENTS

| Number | Country | Date |
|---|---|---|
| 967,786 | France | June 17, 1948 |

OTHER REFERENCES

Publication I—Journal of the Society of Motion Picture Engineers, vol. 28, No. 6, June 1937, pages 633–642.